United States Patent [19]

Greenawalt et al.

[11] 4,260,184

[45] Apr. 7, 1981

[54] FLUID COUPLING USING STAPLE INTERLOCK

[75] Inventors: Thomas H. Greenawalt, Van Wert; Daniel E. Kimmet, Delphos, both of Ohio

[73] Assignee: Aeroquip Corporation, Jackson, Mich.

[21] Appl. No.: 4,363

[22] Filed: Jan. 18, 1979

[51] Int. Cl.³ .................................................. F16L 37/14
[52] U.S. Cl. ................................... 285/305; 285/369
[58] Field of Search ............... 285/305, 321; 403/355, 403/379, 378, 319, 315

[56] References Cited

U.S. PATENT DOCUMENTS

| 2,413,106 | 12/1946 | Kelle | 285/321 X |
|---|---|---|---|
| 3,490,795 | 1/1970 | Hennlich | 285/305 |
| 3,527,485 | 9/1970 | Goward et al. | 285/305 |
| 3,606,402 | 9/1971 | Medney | 285/305 |
| 3,973,791 | 8/1976 | Porta et al. | 285/305 |

FOREIGN PATENT DOCUMENTS

| 1204894 | 6/1966 | Fed. Rep. of Germany . | |
| 1951765 | 10/1966 | Fed. Rep. of Germany . | |
| 1953434 | 10/1966 | Fed. Rep. of Germany . | |
| 1988018 | 2/1969 | Fed. Rep. of Germany . | |
| 1810347 | 9/1970 | Fed. Rep. of Germany | 285/305 |
| 1914465 | 10/1970 | Fed. Rep. of Germany . | |
| 7241954 | 3/1974 | Fed. Rep. of Germany . | |
| 2360921 | 6/1974 | Fed. Rep. of Germany | 285/305 |
| 1525525 | 5/1975 | Fed. Rep. of Germany . | |
| 7331962 | 6/1975 | Fed. Rep. of Germany . | |
| 2500615 | 7/1976 | Fed. Rep. of Germany | 285/305 |
| 2605777 | 8/1977 | Fed. Rep. of Germany | 285/305 |
| 1238801 | 6/1960 | France | 285/305 |
| 6416 | 5/1895 | Switzerland | 403/355 |
| 569915 | 11/1975 | Switzerland | 285/305 |
| 1066936 | 4/1967 | United Kingdom | 285/305 |

OTHER PUBLICATIONS

Aeroquip, Bulletin 5500, 1977.
Stratoflex, Bulletin No. SSE-73-02-01B.

*Primary Examiner*—Thomas F. Callaghan
*Attorney, Agent, or Firm*—Beaman & Beaman

[57] ABSTRACT

The improvement relates to fluid couplings utilizing components interconnected by an elongated pin or staple wherein insertion of the staple after assembly of the coupling parts maintains the parts in fluid tight relationship. The invention includes the forming of fluid coupling members permitting accomodation of staples having various cross sectional configurations, and the staple of the invention is of a D cross sectional configuration providing optimum resistance to fatigue failure, improved tensile strength, and consistent retention within the fitting under operative conditions.

4 Claims, 7 Drawing Figures

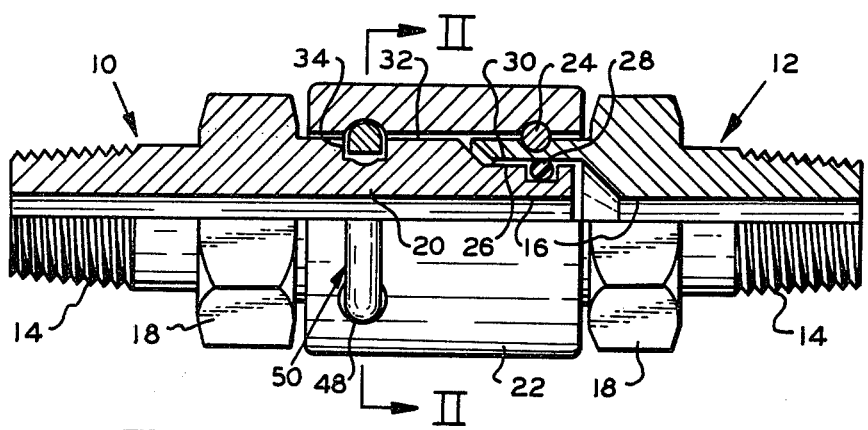
FIG. 1.
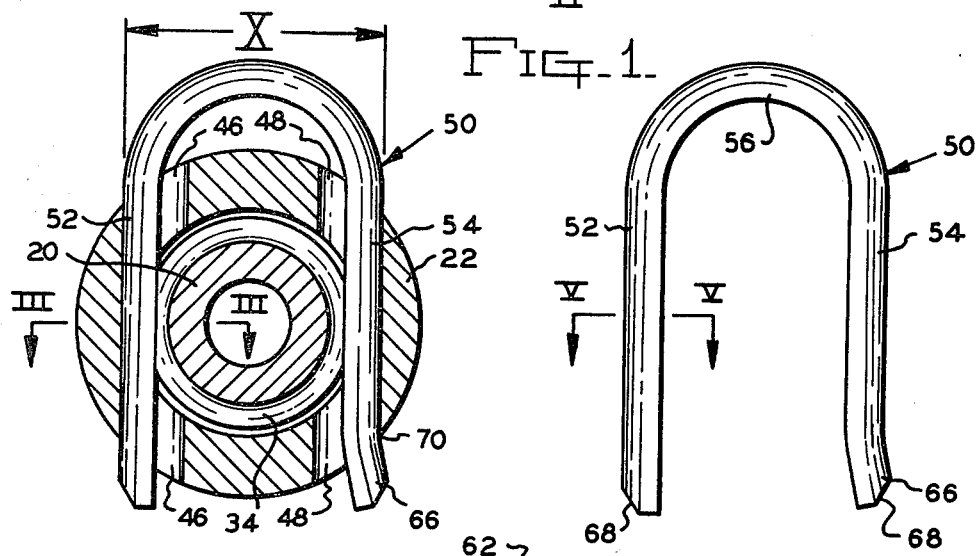
FIG. 2.   FIG. 4.
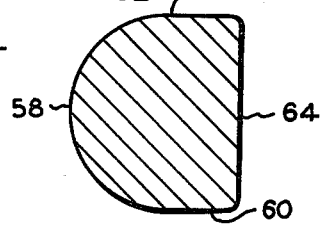
FIG. 5.
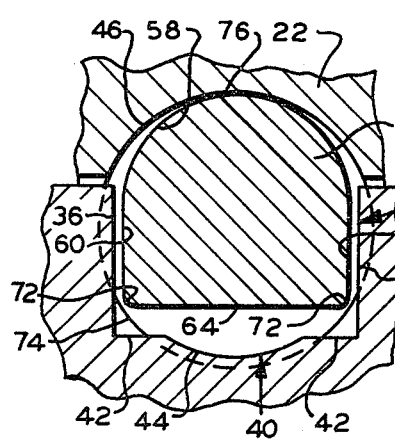 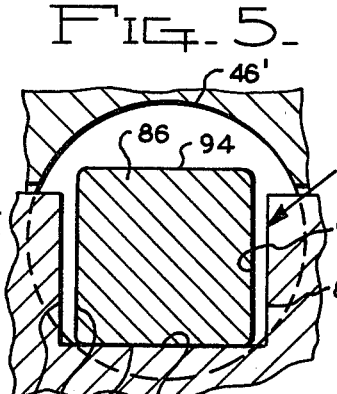 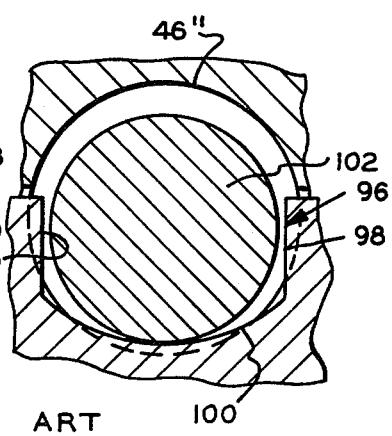
FIG. 3.   FIG. 6.   FIG. 7.
PRIOR ART

FLUID COUPLING USING STAPLE INTERLOCK

SUMMARY OF THE INVENTION

The invention pertains to fluid couplings utilizing a staple interlock, and the staple for such couplings.

Fluid couplings basically consist of two mating parts adapted to be connected in fluid tight relationship by retention means. Conventional fluid couplings have utilized retention means in the form of threaded fasteners, nuts and sleeves, ball detents, ring clamps and the like. The type of retention means is often determined by the type of coupling, the coupling operating pressure, and the mode of movement desired to achieve connection and release of the parts. With fluid couplings used in hydraulic applications where very close quarter situations exist, such as where a plurality of couplings are mounted side-by-side to valves or a manifold, conventional retaining means are objectionable because of a lack of access thereto, and couplings utilizing retention means in the form of a quick release staple have been developed. Such coupling fittings are widely used in the mining industry, and have the advantage that linear movement of the staple in a direction transverse to the coupling axis permits uncoupling, and yet the staple permits swiveling of the coupling parts relative to each other which has the advantage of eliminating hose strain.

Staple type couplings are widely used in Europe, particularly with mining equipment, and reference is made to German Pat. Nos. 1,204,894; 1,525,525; 1,914,465; 1,951,765; 1,953,434 and 1,988,018. Attention is also directed to German Patent Application Ser. Nos. 7241954 and 7331962, and U.S. Pat. No. 3,490,795.

Such prior art staple type couplings as shown in the aforementioned patents and applications utilize staples or pins having square or circular cross sections, and at least one leg of the staple may be laterally deformed for retention purposes.

In a staple type coupling the male portion of the coupling includes an annular groove which aligns with a staple receiving bore defined in the female coupling part, and upon alignment of the bore and groove the staple leg, or legs, may be inserted in the bore to prevent relative axial displacement between the coupling parts. The staple receiving bores may be defined in fixed female coupling or collars rotatably mounted upon the female coupling parts and the coupling parts are often readily rotatable relative to each other, and such a relationship reduces stress imposed upon flexible hose with which the coupling may be associated. Hose and conduits utilized in hydraulic pressure systems are often subjected to pressure impulses and variations between extreme ranges, for instance, between 0 and 5,000 psi, and such pressure fluctuations often result in axial movement between coupling parts as permitted by clearances in the coupling retention means. Heretofore, staple configurations of either rectangular or circular cross section have resulted in inefficiencies.

Staples of rectangular cross section, usually square, tend to have a short fatigue life and reduced tensile strength. Such conditions result from the fact that the cross sectional area of the coupling staple is often undersized for the pressure conditions of the coupling due to coupling design limitations produced by the square configuration, and the rectangular staple is often improperly supported within the coupling due to the presence of a deformed portion on one or both of the staple legs which exist for retention purposes for preventing inadvertent withdrawal of the staple from the coupling. Rectangular cross section staples also produce brinelling within the staple receiving bore of the female part and the relatively sharp corners of the rectangular staple will produce stress points in the member in which the bores are formed.

Staples having legs of a substantially cylindrical configuration defining a circular cross section have relatively good fatigue life and tensile strength characteristics, however, such staples produce brinelling of the mating male body due to the "line" contact of the staple with the groove sides. This problem may become very severe and may make disassembly of the coupling parts difficult or impossible. Such circular cross section staples employ legs which are "flared" outwardly to provide staple retention within the coupling and, thus, the legs must be squeezed together to permit the staple to be inserted into the coupling bores. Such assembly is often difficult to accomplish.

Another disadvantage of the prior art staple type couplings lies in the inability of the couplings to accommodate staples of either rectangular or circular cross section and if couplings using both staple configurations are mounted on the same apparatus, or used in common locations, inventory problems exist, as well as the likelihood of endeavoring to place the wrong staple within a coupling.

It is an object of the invention to provide a staple type fluid coupling which is of such a construction as to accommodate staples of either rectangular or circular cross section, and which will also accommodate the improved D configuration staple of the invention.

It is a further object of the invention to provide a staple for a staple type fluid coupling wherein increased fatigue life and tensile strength is achieved and wherein consistent staple retention characteristics are maintained throughout the staple life and regardless of the coupling load.

It is an additional object of the invention to provide a staple for staple type fluid couplings which can be assembled and disassembled without requiring special tools or skills, and which may be readily manufactured by conventional fabrication techniques.

In the practice of the invention a fluid coupling includes a male half received within the female half, and the female half includes an annular sleeve rotatably mounted thereon axially extending over a portion of the male half having an annular groove defined therein. Staple receiving bores are defined within the sleeve on opposite sides of the sleeve axis aligning with the male half groove when the couplings halves are fully interconnected wherein insertion of the leg of a staple in the bores will retain the coupling halves in a fully interconnected relationship.

The male half groove is defined by flat radial surfaces and an inner cylindrical surface whose central region includes an annular concave circular cross section segment having a center coincident with the axis of the staple receiving bores when the coupling halves are connected. While the bores are of a cylindrical configuration, the groove configuration permits staples having square, circular and D-shaped transverse cross sections to be used, and such groove configuration provides a fitting universally acceptable to major hydraulic coupling staples.

The staples in accord with the invention are of a U-configuration including legs interconnected by an arcuate base. The cross sectional configuration of the staple legs represents a D wherein a convex cylindrical outer surface tangentially intersects flat side surfaces adapted to engage the male coupling groove sides. The staple inner surface is also flat, and this configuration provides a maximum amount of staple material for a given size of staple receiving bore, permits flat surface engagement between the staple and male coupling half to prevent brinelling, and permits increased fatigue life and tensile strength to be achieved in a staple. The cylindrical outer surface permits intimate engagement of the staple with the staple receiving bores of the female sleeve, and, preferably, one of the staple legs is deformed outwardly adjacent its free end to resist withdrawal of the staple from the coupling bores. The U configuration of the staple base facilitates insertion of a screw driver or the like for staple removal, and the D cross sectional configuration may be economically manufactured.

BRIEF DESCRIPTION OF THE DRAWINGS

The aforementioned objects and advantages of the invention will be appreciated from the following description and accompanying drawings wherein:

FIG. 1 is an elevational view of a fluid coupling in accord with the invention, the upper half being shown in diametrical section, FIG. 2 is an elevational, sectional view as taken along Section II—II of FIG. 1, FIG. 3 is an enlarged, detail, elevational view taken through the staple and groove along Section III—III of FIG. 2, FIG. 4 is an elevational view of the staple in accord with the invention, FIG. 5 is an enlarged, detail, sectional view of the staple as taken along Section V—V of FIG. 4, and FIGS. 6 and 7 are enlarged sectional views similar to FIG. 3 illustrating prior art relationships between staples and coupling grooves of staples having square and circular cross sections, respectively.

DESCRIPTION OF THE PREFERRED EMBODIMENT

With reference to FIG. 1, a hydraulic fluid coupling is shown including a male half 10 and a female half 12. The coupling halves are connectable to conventional hydraulic system components, such as hoses, adapters, plumbing fittings or the like, not shown, and for such purpose each coupling half is provided with pipe threads 14 and an internal passage 16. Additionally, each coupling half may be provided with a hexagonal boss 18 defining wrench flats for holding the coupling half during assembly to the associated conduit, or fitting.

The coupling half 10 is provided with a nose 20 adapted to be received within the locking sleeve 22 rotatably mounted upon coupling half 12 by drive wire 24. The nose includes a reduced cylindrical diameter portion 26 having a groove in which O-ring 28 is received for sealing engagement with cylindrical surface 30 defined upon half 12, the O-ring establishing the sealing relationship between the coupling halves.

The nose 20 also includes the larger cylindrical portion 32 in which the locking groove 34 is defined. Locking groove 34 is axially defined by spaced, opposed, radially extending flat surfaces 36 and 38, FIG. 3 which intersect diameter 32, and the groove inner surface 40 includes cylindrical portions 42 which are adjacent and intersect groove sidewalls 36 and 38, and the central region of the groove surface 40 is defined by annular concave surface 44 intersecting surfaces 42. The concave surface 44, in cross section, is circular, having a center coaxial with the staple receiving bores defined in the sleeve 22, as will be later described, when the halves 10 and 12 are fully connected.

The locking sleeve 22 includes a pair of bores 46 and 48, FIG. 2, extending through the sleeve adapted to align with the locking groove 34 when halves 10 and 12 are fully interconnected as shown in FIG. 1. The bores are located on opposite sides of the coupling axis and extend through the sleeve for receiving the staple 50.

The staple 50 constitutes a U clip including linear legs 52 and 54 interconnected by an arcuate base 56. The staple has a D configuration, FIG. 5, wherein the staple cross section includes convex cylindrical surface 58, which tangentially intersects the flat staple lateral sides 60 and 62. The fourth side of the staple is defined by the flat inner surface 64 intersecting surfaces 60 and 62, and the surfaces are slightly radiused at these intersections. Thus, the sides 60 and 62 are separated by a distance equal to the diameter of the surface 58.

The staple leg 54 is flared outwardly at 66, and the free ends of the staple legs are chamfered at 68. This chamfering facilitates assembly of the staple within the bores 46 and 48 and the presence of the deformation of flare 66 produces an engagement at 70 between the staple and sleeve which retains the staple within the bores 46 and 48, yet permits the staple to be withdrawn from the bores upon inserting a screw driver or similar tool under the base 56 and prying the staple from the coupling.

The width of the staple 50 as defined by legs 52 and 54 is substantially equal to the distance between the outer portions of the bores 46 and 48 as represented by distance X in FIG. 2. Thus, upon inserting the staple in the bores the convex surface 58 will engage the outer portions of the bores as apparent in FIG. 2 and this frictional engagement, plus that achieved by flare 66, assures sufficient retention of the staple within the coupling.

With reference to FIG. 3, the relationship between a staple leg 52 and the locking groove 34 will be appreciated. As the flat staple sides 60 and 62 are in opposed spaced relationship to the flat groove sides 36 and 38, respectively, engagement of the opposed surfaces will result in reduced area pressures preventing the staples from brinelling into the locking groove surfaces. The presence of the convex surface 58 permits considerable staple material and cross section to be added to the staple as compared with a square staple configuration, note FIG. 6, and this added staple material provides greater resistance to fatigue and stress failures. The D configuration staple contacts the bores 46 and 48 in a surface contact of significant area, and although the staple "corners" 72 may engage the bores 46 and 48 at a line contact at 74, FIG. 3, brinelling of the sleeve 22 is nominal because the surface contact at 76 prevents significant engagement at 74.

The length of the legs 52 and 54 is such that a straight portion of the staple will always be received within the groove 34, and the flare 66 exists radially outward of the contact between the staple and the groove, and the large radius of the base 56 readily excepts the prying tool for removing the staple.

FIGS. 6 and 7 disclose prior art relationships between square and round staples and their conventionally shaped locking grooves. In FIG. 6, the locking groove 78 includes flat radial sides 80 and 82 and cylindrical inner surface 84. The staple 86 is of a square cross section including flat sidewalls 88 and 90, flat inner surface 92 and flat outer surface 94. A circular bore 46' is defined in the locking sleeve. In this staple arrangement the staple is dimensioned such that the inner surface 92 frictionally engages the inner surface 84 of the groove and the flare that is usually associated with a square staple often begins within the groove 78 as compared with the above described relationship when the flare lies well outside the projection of the nose 20 and groove 34. Further, square staples, while resisting brinelling of the surfaces 80 and 82 have short fatigue life and tensile strength in that the cross sectional area of the staple leg is relatively small in view of the fact that a square cross section is inserted within the round configuration of the sleeve 46'.

In FIG. 7 the locking groove 96 is defined by flat radial surfaces 98 and an inner concave surface 100. The circular cross section staple 102 is received within the locking sleeve bores 46" and engages the groove surfaces 98 to prevent disassembly of the coupling halves. As the staple produces a line contact with the surfaces 98 brinelling often occurs at these surfaces causing metal displacement which prevents disassembly of the coupling halves. Further, such round staples are often formed such that the legs thereof diverge in a direction away from the staple base, rather than using a flare adjacent a staple free end, and the frictional force provided by such leg diversion may not be sufficient to overcome vibrations as the fluid system pulses, and the staple may be accidentally dislodged from the bores 46". Additionally, diverging staple legs require that the staple legs be squeezed together for insertion into the sleeve bores, which is often difficult.

The configuration of the locking groove 34, FIG. 3, because of the presence of the surfaces 42, and the presence of the concave surface 44, permits the coupling halves 10 and 12 to be readily employed with square and round cross section staples as shown in FIGS. 6 and 7. Thus, the groove configuration of FIG. 3 is "universal" with respect to the three staples cross sections described. Such universality is not achievable with the groove configurations of the prior art as represented in FIGS. 6 and 7.

It will therefore be appreciated that the groove configuration, and the staple construction provided by the D configuration, results in a coupling capable of accepting three types of staple cross sections, and also results in a staple having superior operating and assembly characteristics. The D configuration minimizes brinelling, and yet adds the improved physical characteristics to a staple not attained by the rectangular or square configuration. The D configuration can be economically produced by rolling round wire to form the surface 64, and after the staple is formed forging of the staple between flat dies readily produces flat surfaces 60 and 62.

It is appreciated that various modifications to the inventive concepts may be apparent to those skilled in the art without departing from the spirit and scope of the invention.

We claim:

1. In a fluid coupling having a pair of coaxial tubular parts interconnected by a staple capable of accommodating a variety of staple cross section configurations and wherein one part comprises a male member having an longitudinal axis and an annular locking groove and the other part comprises a female member having a cylindrical staple receiving bore aligned with said locking groove when said parts are fully mated whereby a staple inserted in said bore is received within said groove to interlock said parts, the improvement comprising said groove having flat, spaced, opposed, radially extending sides defining the groove axial dimension and a base surface consisting of cylindrical surfaces defined adjacent and intersecting each side and an annular concave arcuate portion intermediate and intersecting said cylindrical surfaces of lesser axial dimension than the width of conventional square cross section staples whereby the bore and groove will accomodate U-shaped staples of square, circular and D configuration cross section wherein the convex surface of D configuration cross section staples comprises the staple outer surface and a square configuration cross section staple will engage said cylindrical surfaces.

2. In a fluid coupling having a pair of coaxial tubular parts interconnected by a staple wherein one part comprises a male member having a longitudinal axis and an annular locking groove and the other part comprises a female member having a pair of cylindrical staple receiving bores aligned with said locking groove when said parts are fully mated whereby a staple inserted in said bores is received within said groove to interlock said parts, said groove having flat, spaced, opposed, radially extending sides defining the groove axial dimension, the improvement comprising, said staple being of a U configuration including a pair of elongated leg portions inserted within the staple receiving bores and received within the groove each having a substantially D configuration transverse cross section including flat first and second parallel lateral side surfaces defining opposite sides of the staple in the general plane of the staple and adapted to be in opposed engageable relationship to the flat sides of said groove, a flat surface defining an inner staple third surface substantially perpendicularly intersecting said first and second side surfaces and a convex arcuate surface defining an outer fourth staple side opposite to said third surface adapted to engage the outer concave portion of the staple receiving bores and being of lesser diameter than the bores, the engagement of said staple lateral sides and groove sides and staple arcuate surface and associated bore minimizing the occurrence of localized stress points in said coupling parts.

3. In a fluid coupling as in claim 2 wherein said convex arcuate surface intersects said first and second side surfaces in a substantially tangential manner.

4. In a fluid coupling as in claim 3 wherein said convex surface constitutes a cylindrical segment.

* * * * *